United States Patent [19]

Palm

[11] Patent Number: 5,034,811
[45] Date of Patent: Jul. 23, 1991

[54] VIDEO TRIGGER IN A SOLID STATE MOTION ANALYSIS SYSTEM

[75] Inventor: Douglas E. Palm, Solana Beach, Calif.

[73] Assignee: Eastman Kodak Company, Rochester, N.Y.

[21] Appl. No.: 505,095

[22] Filed: Apr. 4, 1990

[51] Int. Cl.[5] .............................................. H04N 7/18
[52] U.S. Cl. ................................. 358/105; 358/213.19
[58] Field of Search ............. 358/105, 213.19, 213.25, 358/213.26

[56] References Cited

U.S. PATENT DOCUMENTS

| | | | |
|---|---|---|---|
| 4,322,752 | 3/1982 | Bixby | 358/213 |
| 4,496,995 | 1/1985 | Colles et al. | 360/9.1 |
| 4,819,068 | 4/1989 | Cooper et al. | 358/105 X |
| 4,825,291 | 4/1989 | Mimura et al. | 358/105 X |

*Primary Examiner*—Victor R. Kostak
*Attorney, Agent, or Firm*—William F. Noval

[57] ABSTRACT

A solid state motion analysis system stores images of an event at a fast frame rate and plays back the images at a slower frame rate to facilitate analysis of the event. The motion analysis system includes a solid state imager which is selectively operable at different frame rates and further includes a solid state memory for storing a plurality of image frames. A video trigger circuit includes a comparison circuit to compare selected images produced by the imager to determine a change in the value of an image characteristic between the images. When a change is determined, the video trigger circuit produces a trigger signal to alter the mode of operation of the motion analysis system. Thus, storage of image frames may be started or stopped when a difference in luminance or color occurs between successive image frames, such difference indicating a change in the event.

11 Claims, 5 Drawing Sheets

VIDEO TRIGGER IN A SOLID STATE MOTION ANALYSIS SYSTEM

BACKGROUND OF THE INVENTION

This invention relates in general to a motion analysis system which records images of an event at a fast frame rate and plays back the images of the event at a slower frame rate so that the event may be analyzed. More particularly, this invention relates to a solid state motion analysis system having a video trigger circuit for changing the mode of operation of the motion analysis system in response to a change in an image characteristic of selected images of the event.

Motion analysis systems are useful for analyzing rapidly changing events. One type of motion analysis system records a great number of images during an event at a high or fast image frame rate and reproduces the image frames more slowly at a lower frame rate. Thus, any movement occurring during the event may be analyzed in a step by step progression. Applications for a motion analysis system include, malfunctions in high speed machinery, movements of an athlete, testing of safety equipment, shattering of an object, etc. One type of motion analysis system is disclosed in commonly assigned U.S. Pat. No. 4,496,995 issued Jan. 29, 1985. As disclosed in the latter patent, the motion analysis system/fast frame recorder includes a video camera, a variable speed processor and a video display monitor. The camera is read out in block format so that, a plurality of lines of video information that correspond to rows of photosites in the camera solid state imager, are simultaneously recorded on magnetic tape in parallel longitudinal tracks. During playback, the magnetic tape is played back at a reduced tape speed. A plurality of parallel video signals reproduced from parallel tracks on the tape are processed into a serial video signal which may be used with standard video monitors. A magnetic tape motion analysis system is advantageous, because of the ability to record a large number of image frames and because of the nonvolatility of the image storage. However, there are limitations to magnetic tape recording. Thus, magnetic tape motion analysis systems tend to be costly, since, in recording and reproducing a plurality of parallel video signals, separate record and reproduce signal processing circuitry must be provided for each video signal channel. Moreover, since the video signals are recorded directly on magnetic tape in an analog format, picture quality is degraded significantly due to induced flutter and other noise, due to reduced bandwidth and increased phase distortion and due to imprecisely recorded pixel signal values.

In many applications where the use of a motion analysis system is appropriate, the event to be analyzed may occur after a long period of static activity in the scene under analysis. Due to the inherent recording length constraints of a magnetic tape motion analysis system, such a system's ability to capture randomly occurring events may require the recording of a large number of image frames which are unnecessary for the analysis of the event. During playback, the unwanted images must be scanned before images relating to the event can be analyzed, resulting in a waste of time, money and recording tape. Moreover, certain events may be incapable of being recorded due to the length of elapsed time between recordable events.

SUMMARY OF THE INVENTION

According to the present invention, there is provided a motion analysis system which minimizes the limitation of magnetic tape motion analysis systems. According to an aspect of the present invention, a motion analysis system includes solid state memory for storing a plurality of image frames produced by a solid state imager, wherein, picture degradation produced by flutter in a magnetic tape motion analysis system is eliminated and wherein dropouts are minimized to single pixel events. According to another aspect of the present invention, video information representing image frames are stored in digital format in the solid state memory. Thus, media noise and electronic noise associated with recording and playback from magnetic tape is inherently eliminated. Moreover, bandwidth limitations and phase distortion produced in magnetic tape recording systems is minimized by digital storage of image frames.

According to a further aspect of the present invention, a solid state motion analysis system includes video trigger circuitry, which compares selected image frames produced by a solid state imager, to determine when a change in an image characteristic occurs between the selected image frames. If a change in image characteristic is determined, a trigger signal is produced to alter the mode of operation of the motion analysis system in order to capture a desired event. According to a preferred aspect of the present invention, the trigger signal causes the solid state memory to either begin or stop recording image frames produced by said solid state imager.

DESCRIPTION OF THE DRAWINGS

In a detailed description of a preferred embodiment of the invention presented below, reference is made to the accompanied drawings, in which like numerals refer to like elements.

DETAILED DESCRIPTION OF THE PREFERRED EMBODIMENT

Figure 1:
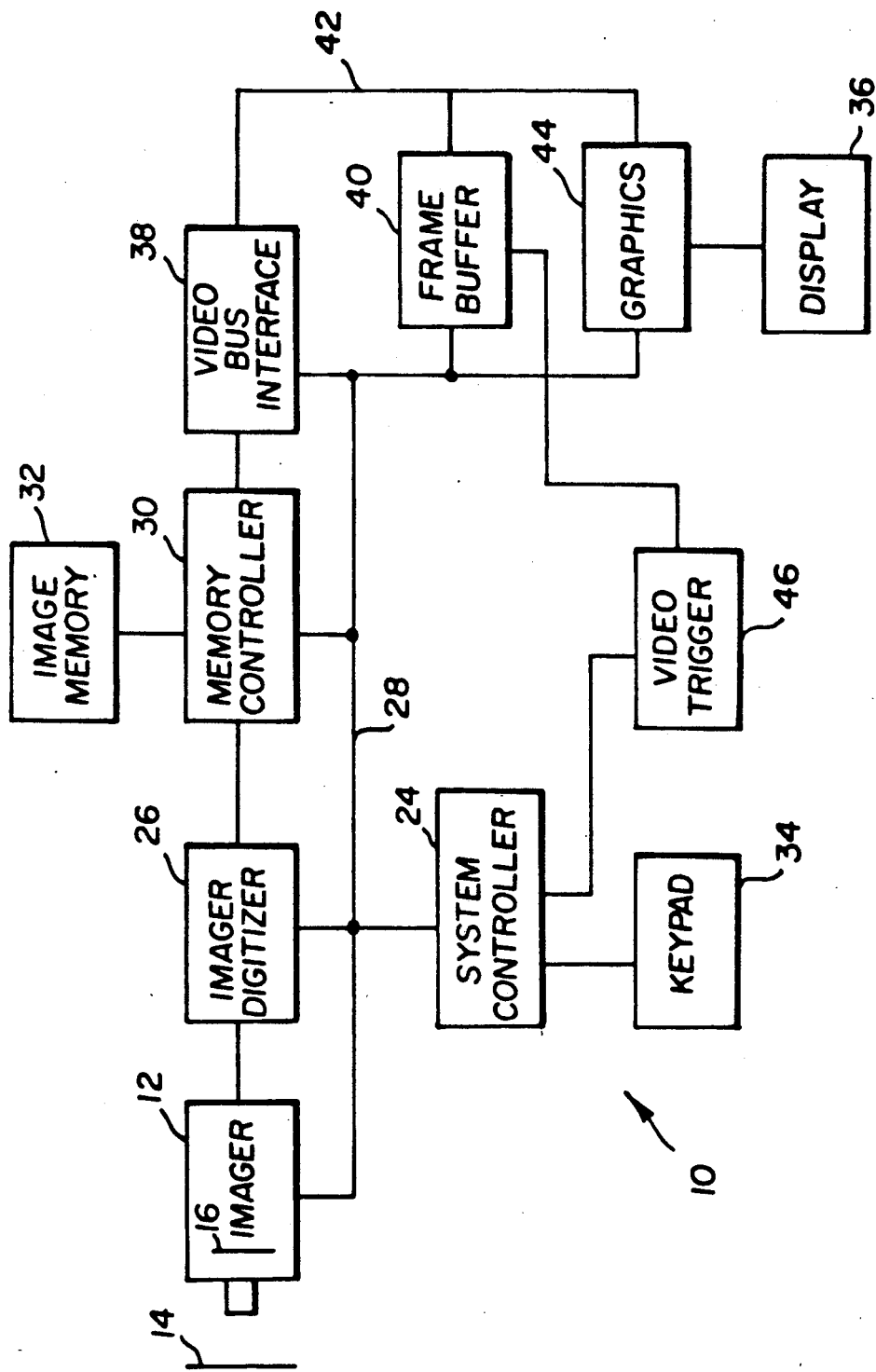
FIG. 1 is a block diagram of a preferred embodiment of the solid state motion analysis system of the present invention.

Referring now to FIG. 1, there will be described a preferred embodiment of the motion analysis system of the present invention. As shown in FIG. 1, motion analysis system 10 includes solid state imager 12 which images an event such as scene 14 by means of a solid state area image sensor 16. Imager 12 is controlled by system controller 24. Controller 24 supplies suitable timing and control signals to imager 12 over bus 28 as a function of operator selectable parameters, such as frame rate and exposure time, among others. Imager 12 may operate for example at frame rates of 1 to 1,000 frames per second.

Figure 2:
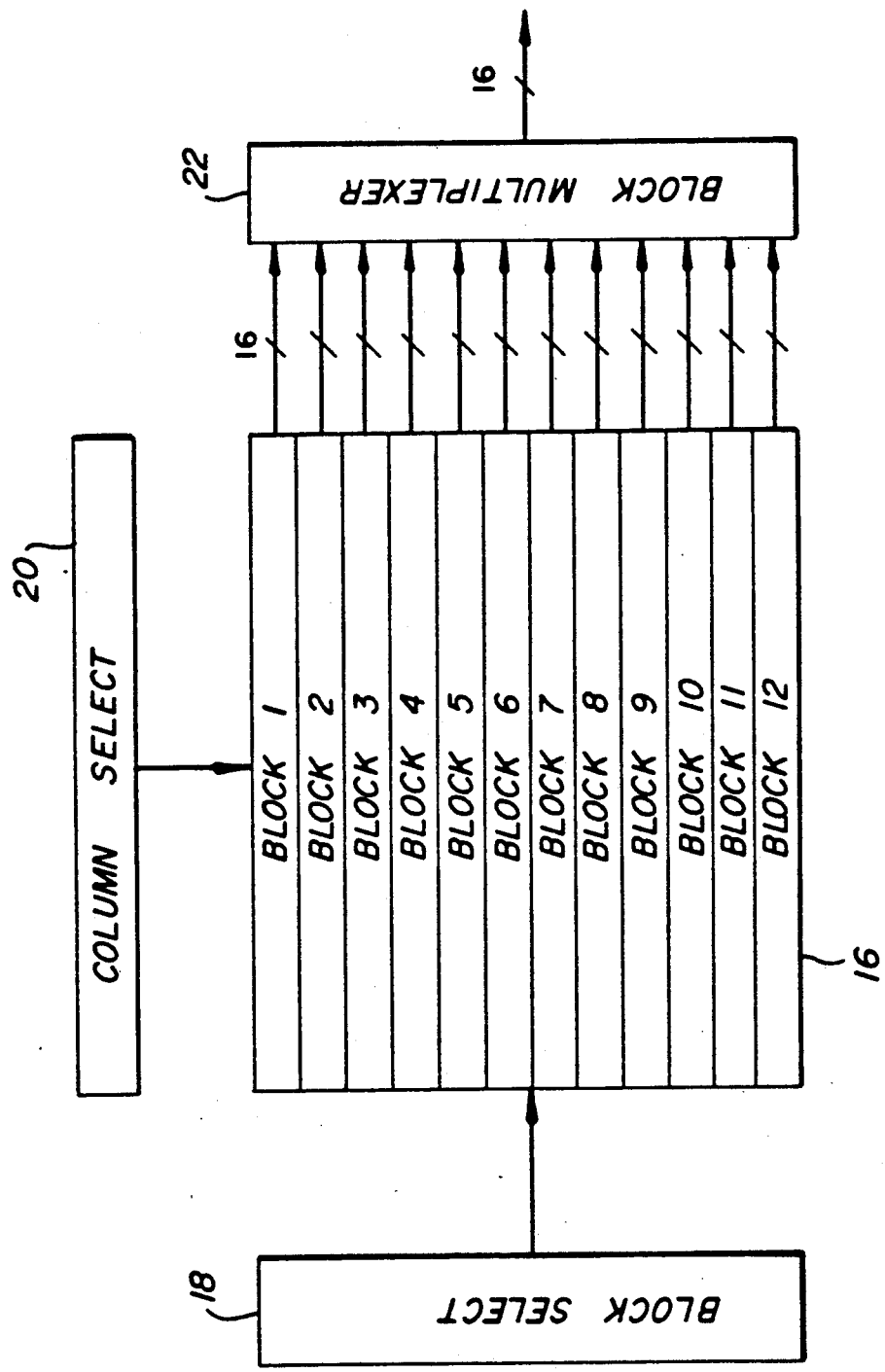
FIG. 2 is a functional block schematic diagram of a block readable image sensor.

Image sensor 16 is preferably a block readable area image sensor. The basic concept of a block readout of a solid state area image sensor and the timing and control thereof is disclosed in U.S. Pat. No. 4,322,752 in the name of James A. Bixby. Although the referenced patent provides detailed information, a brief description of the concept of block readout may be illustrated with respect to FIG. 2. FIG. 2 shows an area image sensor 16 that includes an array of photosites (not individually shown) arranged in rows and columns. For example, sensor 16 may include an array of 192 rows of 256 photosites in each row. Each photosite represents a picture element (pixel) of an image projected onto sensor 16. For purposes of readout, sensor 16 is schematically shown as being formated into 12 blocks of 16 photosite rows in each block. Through appropriate control circuitry, including block select circuit 18 and column select circuit 20, blocks 1 to 12 of sensor 16 are sequentially readout as parallel rows of photosites to block multiplexer circuit 22. Multiplexer 22 produces an image frame signal which includes 12 sequential blocks of video information wherein each block of video information includes 16 parallel lines of analog video signals. Each line of video information includes 256 pixels of variable image characteristics such as luminance, color, etc.

The parallel lines of analog video signals from imager 12 are supplied to imager digitizer 26. Imager digitizer 26 amplifies and conditions the parallel analog signals for preparation to be digitized. Digitizer 26 includes an analog to digital converter on each parallel signal line in order to convert each analog signal into a digital signal. Each analog-to-digital converter will output a digital signal having a digital value of a predetermined number of bits, such as eight. Digitizer 26 takes the bit information from each analog-to-digital converter and converts the information into a bit serial format on an output line. Thus, in this example, after serialization, there are the same number of parallel digital signal lines which are output from image digitizer 26 as the number of parallel analog signal lines which are input to digitizer 26. System control 24 supplies control and timing signals to digitizer 26 over control and timing bus 28.

External data signals from a source (not shown) may be temporally associated with an image frame by interleaving the external data with the image data in digitizer 26.

Memory controller 30 receives the parallel lines of serialized digital information from digitizer 26 and stores it in image memory 32. Memory 32 is made up of a number of solid state random access memory devices, such as DRAMS or SRAMS. Inherently, to store information in a random access memory, a location needs to be addressed and then the information written to their input port. Memory controller 30 is used to give order to the random access capability of the solid state memory. When recording, controller 30 generates the address signals to the RAM in a known fixed sequential format.

Motion analysis system 10 may be operated in several recording modes. In one recording mode, once image memory 32 is full up, no more images from imager 12 are stored in memory 32. In another recording mode, the storing of image frames in memory 32 is circular so that once memory 32 is full (i.e. cannot store another image frame in a unique location) the newest image frame is recorded over the oldest image frame. In this manner, image frames from imager 12 are continuously recorded in memory 32 over older images frames until a stop signal is applied by system controller 24. This stop signal may be the result of a signal generated by the operator from keypad 34 or by a trigger signal. A trigger signal may be produced by an external trigger source or by the video trigger circuit of the present invention.

Figure 3:
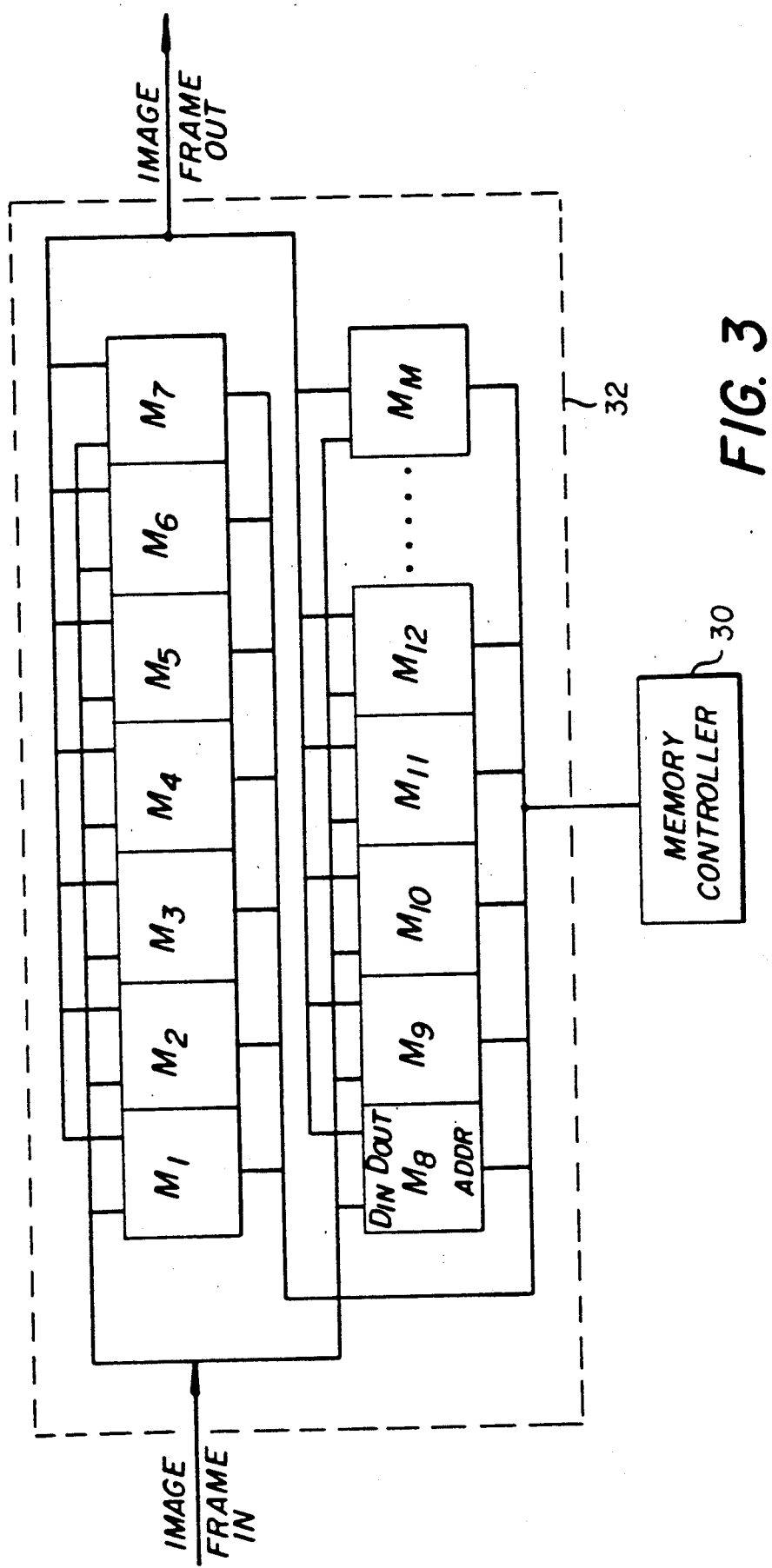
FIG. 3 is a functional block schematic diagram of the solid state memory of the embodiment of FIG. 1.

Memory 32 may have a storage capacity of any size but should be large enough to store a sufficient number of image frames to capture an event in totality for later analysis. As shown in FIG. 3, memory 32 includes M image frame locations numbered M to $M_m$. As an example, if an image frame plus external data information forms a display matrix of 256×256 pixels and each pixel is represented by 8 bits of information, each image frame stored in memory 32 occupies approximately 65 kilobytes of memory. If 1,000 image frames are to be stored, then memory 32 must have approximately 65 megabytes of solid state memory storage.

Image frames stored in memory 32 are displayed on display device 34. Memory controller 30 receives the serialized parallel digital information of an image frame from image memory 32 and supplies it to video bus interface 38. Interface 38 reformats the digital video received from memory 32 via controller 30 and stores it in frame buffer 40 by way of video bus 42. The video bus interface 38 also receives header data relating to each image frame, deinterleaves the header information and stores it in a reserved section of each frame stored in frame buffer 40. Frame buffer 40 has the capacity to store several frames of video data.

The digital video stored in frame buffer 40 is supplied to graphics module 44 by way if video bus 42. Graphics module 44 sums data border information with the video information and converts the digital signal to an analog signal which is displayed on display device 36.

According to the present invention, motion analysis system 10 includes a video trigger circuit 46. Video trigger circuit 46 alters the mode of operation of motion analysis system 10 when there is a change in an image characteristic between two selected (e.g., successive) image frames. The changed image characteristic may, for example, be a change in the gray scale value of an image frame or a change in the color of an image frame. A change in image characteristic is indicative of a change in a static scene which is being imaged by imager 12, thus identifying an event to be recorded for later analysis. If motion analysis system 10 is in a continuous recording mode, in which new image frames are recorded over old image frames in memory 32, the trigger signal produced by video trigger 46 is used to stop recording. Thus, image frames before and after the triggering event may be stored in the memory 32. The trigger signal produced by video trigger circuit 46 can also be used to start the recording of image frames produced by imager 12.

Figure 4:
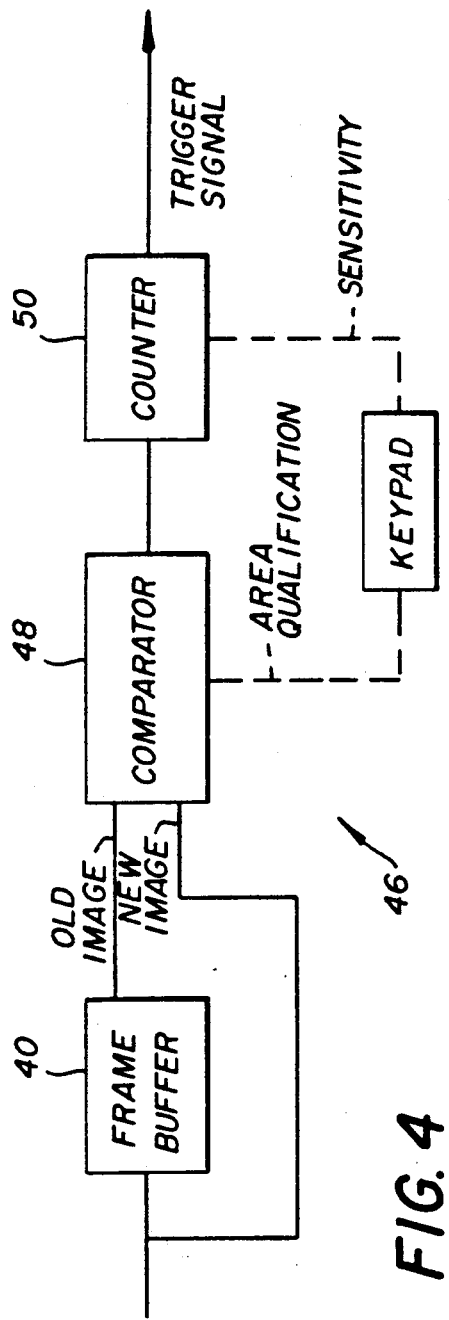
FIG. 4 is a block schematic diagram of a video trigger circuit of the embodiment of FIG. 1.

Referring to FIG. 4, there is shown a preferred embodiment of the video trigger circuit of the present invention. As shown, video trigger circuit 46 includes comparator 48 and counter 50. Comparator 48 compares the digital signal of an old image frame from frame buffer 40 with the digital signal of a new image frame from video bus 42. The comparison may be a pixel-by-pixel comparison or a multiple pixel-to-multiple pixel comparison. If the old and new image frame signals are, for example, black and white signals, the comparison may be of the grey scale value of each pixel. If the image frame signals are color signals, the comparison may be of the luminance characteristic of the color signal or of one of the color characteristics of the color signal.

When comparator 48 determines a difference in the signal value between the old and new image frames, it produces a signal which is supplied to counter 50. Counter 50 may be programmed to produce a trigger signal when a predetermined number of pixel differences between the old and new image frames are determined by comparator 48. The trigger signal is supplied to system controller 24 which causes motion analysis system 10 to change its operating mode. For example, if motion analysis system 10 operates in a non-recording mode, the trigger signal causes system controller 24 to effect the start of storing image frames produced by imager 12 in image memory 32. If motion analysis system 10 operates in a continuous record mode, this trigger signal causes controller 24 to effect the end of storing image frames in memory 32.

Figure 5A:
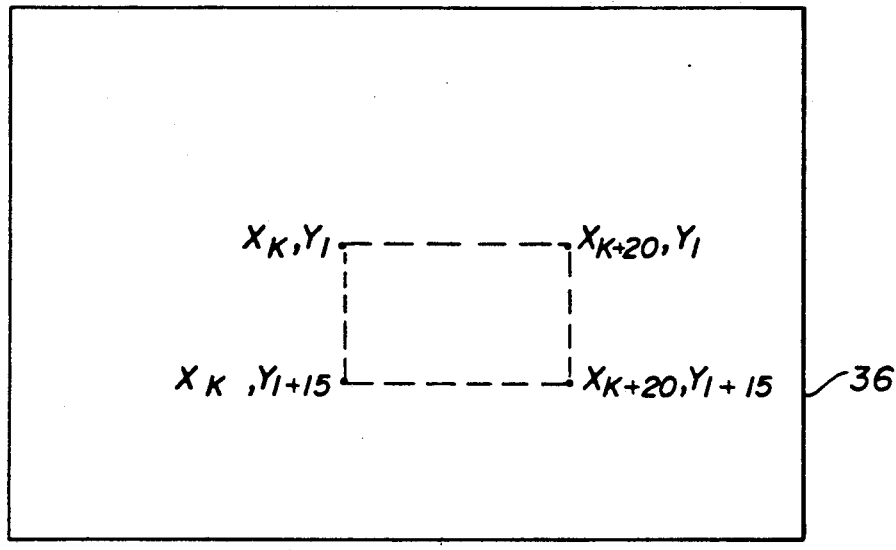
FIGS. 5A and 5B are respective diagramatic showings useful in illustrating the video trigger function of the present invention.
Figure 5B:
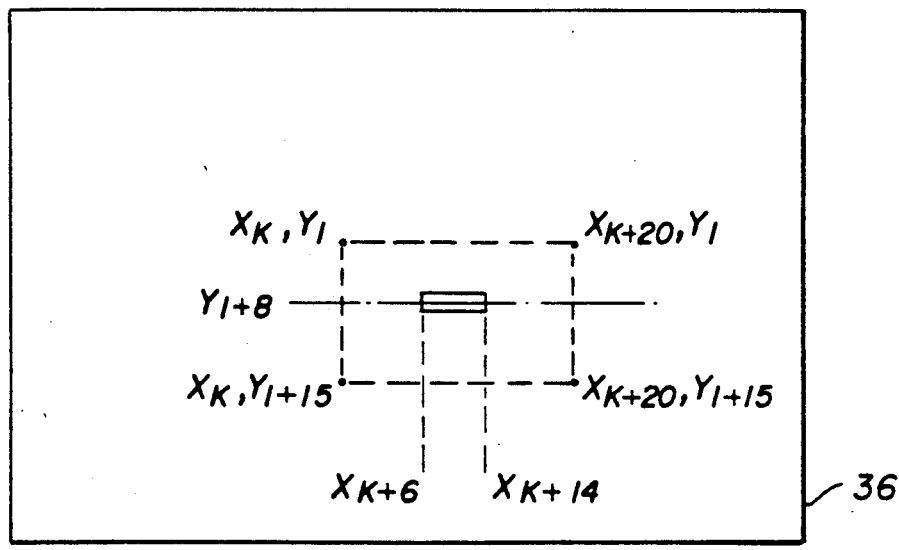

According to an aspect of the present invention, a subregion of an image frame may be monitored for a change in image characteristic. The size of the monitored subregion is variable and is controlled by the operator from keypad 34. Reference is made to FIGS. 5A and 5B to illustrate this feature. As shown in FIG. 5A, the subregion to be monitored includes a pixel array which is 20 pixels wide by 15 pixels high. As shown in FIG. 5A, this subregion is bounded by corner pixels having values $X_k$, $Y_1$, $X_{k+20}$, $Y_1$, $X_k$, $Y_{1+15}$, and $X_{K+20}$, $Y_{1+15}$. In FIG. 5A, the scene is shown as blank. As shown in FIG. 5B, a projectile has entered into the monitored subregion. In such case, a pixel-by-pixel comparison by comparator 48 (FIG. 4) of the monitored subregion of the new image frame shown in FIG. 5B with the old image frame shown in FIG. 5A, produces a number of pixel characteristic differences which are counted by counter 50. If the number of pixel differences exceed a predetermined value, then counter 50 produces a trigger signal. This predetermined value is programmable from keypad 34 by the operator as a sensitivity signal.

Figure 6:
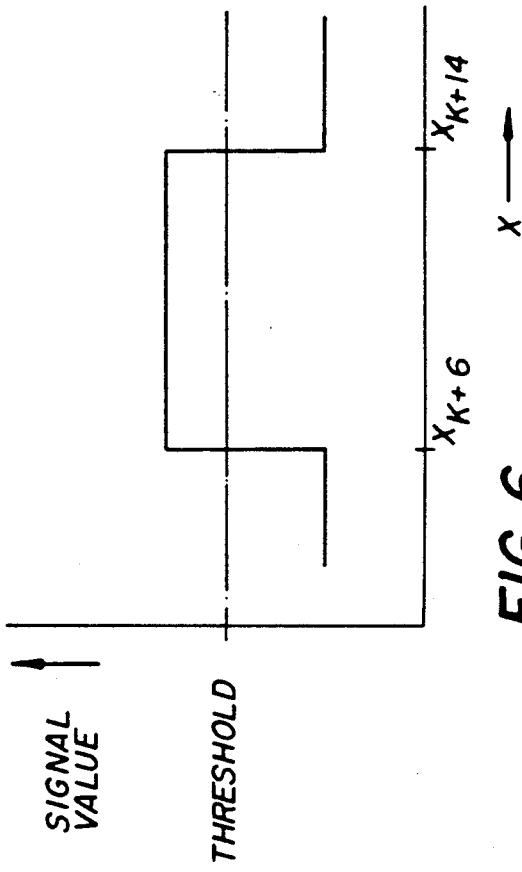
FIG. 6 is a signal diagram useful in illustrating the operation of the present invention.

Referring to FIG. 6, there is shown a graph of the change in signal value of a scan line $Y_{1+8}$ which includes 9 pixels $X_{k+6}$ to $X_{k+14}$ which exceed the threshold pixel value of the image of FIG. 5A. Thus, counter 50 produces a count of 9 during monitoring of line $1+8$. If this count, added to the counts from other lines, exceeds a predetermined threshold value, a trigger signal is produced by trigger circuit 46 which effects a change in the mode of operation of system 10.

Although the invention has been described in detail with particular reference to a preferred embodiment thereof, it will be understood that variations and modifications can be effected within the spirit and scope of the invention as described above and as defined in the appended claims.

What is claimed is:

1. A solid state motion analysis system comprising:
   solid state imager means for capturing an image of an event and for producing an image frame signal having a variable image characteristic, wherein said imager means is selectively operable at different image frame rates up to several hundred frames per second;
   means for comparing selected image frame signals produced by said imager means to determine a change in the value of said image characteristic between said selected image frame signals;
   means for producing a trigger signal in response to a change in image characteristic determined by said comparing means; and
   solid state memory means for storing a plurality of image frame signals produced by said imager means, wherein said trigger signal starts or stops storage of image frame signals in said memory means, such that said imager means frame rate is unaffected by said trigger signal.

2. The solid state motion analysis system of claim 1 wherein said comparing means compares the image characteristic of a subregion of said selected image frame signals.

3. The system of claim 2 including means for varying the size of the subregion of an image frame signal to be compared by said comparing means.

4. The motion analysis system of claim 1 wherein said trigger signal producing means includes a counter for counting the number of changes in the value of said image characteristic between said selected image frame signals and wherein said trigger signal is produced when said number of changes exceeds a predetermined value.

5. The system of claim 4 including means for varying the value of said predetermined value.

6. A solid state motion analysis system comprising:
   solid state imager means having a plurality of photosites arranged in an array of rows and columns for capturing an image of an event and for producing an image by reading out blocks of parallel rows of photosites;
   said image frame signal having a variable image characteristic and including sequential blocks of video information, wherein each block of video information includes parallel lines of video signals and wherein said imager means is selectively operable at different image frame rates up to several hundred frames per second;
   means for comparing selected image frame signals produced by said imager means to determine a change in the value of said image characteristic between said selected image frame signals;
   means for producing a trigger signal in response to a change in image characteristic determined by said comparing means; and
   solid state memory means for storing a plurality of image frame signals produced by said imager means, wherein said trigger signal starts or stops storage of image frame signals in said memory means, such that said imager means frame rate is unaffected by said trigger signal.

7. The system of claim 6 wherein said comparing means compares consecutive image frame signals produced by said imager means to determine a change in the grey scale value between said consecutive image frame signals and wherein said trigger producing means produces a trigger signal in response to a change in the grey scale value between said consecutive image frame signals.

8. The system of claim 6 wherein said selected image frame signals include a matrix of pixels and said comparing means compares the same subset of pixels of said selected image frame signals to determine a change in the value of said image characteristic in said subregion between said selected image frame signals.

9. The system of claims 8 including means for varying the size of said subset of pixels of said selected image frame signals to be compared by said comparing means.

10. The system of claim 6 wherein said image frame signals comprise a plurality of pixels having said image characteristic; wherein said comparing means compares the value of said image characteristic of a least some of the pixels of consecutive image frame signals; and wherein said trigger producing means includes counter means for counting the number of pixels which are determined to be different by said comparing means and for producing said trigger signal when said count exceeds a predetermined value.

11. The system of claim 10 including means for changing the value of said predetermined value.

* * * * *